| United States Patent [19] | [11] Patent Number: 4,582,761 |
| Liu | [45] Date of Patent: Apr. 15, 1986 |

[54] ANTI-GLARE COATING

[76] Inventor: Peter D. Liu, 70 Marcellus Rd., Newton, Mass. 02159

[21] Appl. No.: 636,369

[22] Filed: Jul. 31, 1984

[51] Int. Cl.$^4$ .................. C03C 17/32; C09D 3/76; B05D 5/06; B05D 7/26

[52] U.S. Cl. .................. 428/442; 427/64; 427/68; 427/108; 427/110; 427/164; 427/165; 427/169; 428/522; 523/122; 524/379; 524/524

[58] Field of Search ............ 427/164, 165, 169, 108, 427/110, 64, 68; 428/442, 522; 523/122, 379, 524

[56] References Cited

U.S. PATENT DOCUMENTS

| | | | |
|---|---|---|---|
| 1,929,352 | 10/1933 | Davidson | 428/442 |
| 2,297,417 | 9/1942 | Kampfer | 428/442 |
| 2,734,142 | 2/1956 | Barnes | 313/92 |
| 3,374,130 | 3/1968 | Junge et al. | 156/24 |
| 3,433,701 | 3/1969 | Armour | 428/442 X |
| 3,576,356 | 4/1971 | Hyman et al. | 350/156 |
| 3,679,451 | 7/1972 | Marks et al. | 117/33.3 |
| 3,697,277 | 10/1972 | King | 96/50 PL |
| 3,736,050 | 5/1973 | Bohum | 350/316 |
| 4,168,332 | 9/1979 | Leinen | 427/160 |
| 4,246,613 | 1/1981 | Choder | 358/245 |

*Primary Examiner*—James R. Hoffman

[57] ABSTRACT

A dispersion for coating a reflective-transmissive surface comprising a mixture of an aqueous dispersion of polyvinyl acetate resin and an aqueous dispersion of an arcylic resin. When applied to such surfaces—for example, the protective glass or plastic of an electronic screen—the coating reduces reflected glare while maintaining the quality of the image transmitted from the screen being viewed. Methods of making and using the dispersion, as well as surfaces treated with the dispersion, are also disclosed.

21 Claims, No Drawings

ANTI-GLARE COATING

BACKGROUND OF THE INVENTION

This invention relates to compositions and methods for treating a reflective-transmissive surface to reduce reflected glare and to surfaces that have been so treated.

Items of various sorts are viewed through an abutting transmissive surface. For example, glass or plastic surfaces are used to protect the electronic viewing screens. By the term "electronic viewing screens," I mean to include viewing screens of all types including, without limitation, screens for television sets, video display terminals, television monitors, test equipment screens, word processor screens, mini-computer screens, main frame computer monitors, other cathode-ray tube screens, liquid crystal displays (LCD's), light emitting diodes (LED's), watches, oscilloscopes, plasma screens, and electroluminescent displays (EL's). By television sets and television monitors, I mean to include black and white television, color television, red/green/blue monitors, green monitors, and amber monitors; I also mean to include digital as well as raster scanning television sets. Artwork or photographs may have intrinsically reflective surfaces, or they may be protected by glass or plastic.

Locations for viewing such surfaces may generate serious glare. For example, the surfaces may reflect room light or light entering through room windows. In the workplace, various equipment may reflect fluorescent lights or incandescent lights as well as window light. Such glare is annoying. More important, it prevents transmission of information and images, it causes squinting and headaches, and it is generally fatiguing and efficiency reducing. There have been considerable complaints about these problems from those who use such screens regularly—for example, office workers.

The problem to be addressed is allowing light to pass from the viewing surface to the viewer, while at the same time significantly reducing or eliminating reflections from that surface. Specifically, where the viewing surface is a glass or plastic surface, light must be transmitted through the surface from an object immediately therebehind, and reflected light must be effectively dispersed.

Various efforts to reduce glare have been disclosed.

Junge et al. U.S. Pat. No. 3,374,130 discloses an etching process for producing low specular reflecting or low image reflecting surfaces on glass.

Leinen U.S. Pat. No. 4,168,332 discloses a non-glare abrasion resistant coating for glass or plastic that protects and overlies artwork. The coating is made by spraying a polymerizable solution comprising an epoxy prepolymer of an epoxy-terminated silane and an oxirane copolymer onto the glass.

King U.S. Pat. No. 697,277 discloses a non-glare reflective photographic print having a matte-surfaced polyester film—for example, poly (ethylene) terephthalate, permanently bonded to the photographic emulsion.

Marks et al. U.S. Pat. No. 3,679,451 discloses coatings for decreasing reflected images from the surface of a transparent sheet used for displays; the coatings are mixtures of organic and inorganic polymers—for example, a mixture of polyvinyl butyral, polyvinyl alcohol acetate copolymer and polysilic acid.

Other attempts to reduce glare include polarized screens or dark nylon mesh. Choder U.S. Pat. No 4,246,613 discloses a screen with electroconductive mesh.

SUMMARY OF THE INVENTION

In one aspect of the invention, I have discovered that an aqueous dispersion of polyvinyl acetate (PVA) can be coated onto a viewing surface to effectively reduce reflected glare and that adding an acrylic resin to the PVA dispersion improves the quality of light transmission from the object to be viewed while maintaining satisfactory glare reduction.

In preferred embodiments, the composition is a mixture of an acrylic matte varnish and a PVA white adhesive, having an adhesive volume to varnish volume ratio of between 8:1 and 1:8.

The invention also features a method of formulating the above-described dispersion in which the two resins are mixed to form a viscous composition that first is dispersed in alcohol and then is diluted with water.

In a third aspect, the invention features a method of reducing glare on a reflective-transmissive surface by applying the above-described dispersion to it.

In a fourth aspect, the invention features a method of reducing glare on a reflective-transmissive surface by applying a dispersion to it that consists essentially of PVA in a vehicle.

Finally, the invention features a reflective-transmissive surface that has been coated with the above described acrylic/PVA dispersion, or with the above-described PVA dispersion.

In preferred embodiments of either of the above glare-reducing methods or surfaces, the surface is glass or plastic protecting an electronic screen as defined above, or the surface is a window used where it is desirable to allow transmission of some diffused light without allowing unimpeded transmission of light and heat—for example, where it is desirable to have privacy or to reduce heating of rooms by sunlight.

The invention provides a durable, glare-reducing coating that allows transmission of light from the immediate vicinity of the coated surface. Specifically, where an object is to be viewed through the surface such as artwork or an electronic screen, light is transmitted from the object so as to provide a clear image with little or no distortion.

At any given instant, electronic screens such as raster scan televisions, or indeed any other screen composed of pixels, produce light at discrete screen locations rather than continuously over the area of the screen. The invention generally can improve the perceived image quality from such screens by creating enough dispersion to "fill in" the unlit regions between lines or pixels with information from the immediately adjacent area. Thus, the invention is particularly advantageous for electronic screens generally and for televisions and computer displays in particular, such as computerized word processing terminals.

Another advantage of the invention is the static dispersion capability of the coating. Static may build up on electronic screens eventually causing deterioration of image and color quality and posing a hazard to sensitive electronic components. The screen coating serves to dissipate the static, thus avoiding excessive build up of charge. While not being bound to any theory, the resin particles in the coating apparently are randomly oriented, thus aiding dispersion of charges that may build up—for example, at phosphor locations on the screen.

DESCRIPTION OF THE PREFERRED EMBODIMENT

In the preferred embodiments, the composition has two major components. An aqueous dispersion of polyvinyl acetate (PVA) provides glare reduction. An aqueous dispersion of acrylic resin provides other useful properties and interacts with the PVA to improve the characteristics of the anti-glare coating as described below.

By polyvinyl acetate resin I mean resins such as those commonly used in latex paints, adhesives, surface coatings, and textile finishes, as typified by the following functional unit:

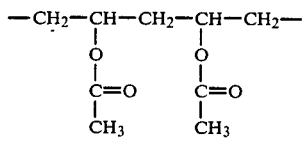

By acrylic resin I mean resins such as those typified by polymers and copolymers of methyl methacrylate, acrylic acid, and acrolein.

The preferred PVA dispersions are water soluble white adhesive. They dry to a generally clear coating with a glare reducing surface that disperses reflected light. These dispersions are relatively easy to work with, being non-toxic and water soluble. A suitable white adhesive dispersion is sold by Borden Chemical Co., Inc. of Columbus, Ohio.

The preferred acrylic resin is an aqueous acrylic emulsion. That emulsion is preferably a matte varnish which includes a flattening agent to preserve the antireflective quality of the coating. Cellite or other diatomaceous flattening agents are suitable, as are magnesium carbonate, alumina hydrate, wax, aluminum stearate, or zinc tungate. Roplex AC 234 (Rohm and Haas) is a suitable acrylic resin base to make acrylic paints, varnishes, etc. Utrecht Co., New York, N.Y., makes a suitable matte varnish.

In presently preferred formulations, an anti-foam additive is included to avoid irregularities in the coating caused by bubbles or foam. A surfactant or detergent may also be included to lower the surface tension of the dispersal, aid spreading, and improve the uniformity of the coating. Presently preferred surfactants are nonionic alkylaryl polyether alcohol types such as the Triton series sold by Rohm and Haas Company, Philadelphia, Pa. Finally, a thickening agent such as sodium polyacrylate may be used to enhance the stability of the formulation. The Acrysol series sold by Rohm and Haas are such suitable agents.

Formulating the Composition

A preferred method for formulating the above-described composition to give improved coating characteristics is described below.

The polyvinyl acetate dispersion is blended with the acrylic dispersion in a volume/volume ratio of between 8:1 and 1:8, and most preferably about 1:2 or 1:3. The resulting mixture has a stiff, gum-like consistency far more viscous than the starting materials. Without being bound to any particular theory, it appears that the PVA and acrylic polymer interact to improve the distortion-free light-transmission properties.

The thick mixture is thinned with isopropyl alcohol while stirring, and then water is added. The alcohol should be added first to avoid agglomeration of the resins.

The resulting mixture is a smoother, more stable dispersion with benefits not provided by the separate components. Specifically, PVA without acrylic resin provides a non-glare surface but is not entirely distortion-free due to its consistency. Acrylic resin by itself provides insufficient viscosity and glare protection but improves the consistency and thus reduces distortion.

Use

The dispersion may be coated on the surface with any suitable applicating device such as a brush or sponge. If carefully applied and allowed to dry, it forms a durable, non-glare coating that does not interrupt transmission of light from the object being viewed.

Specifically, the coating is applied to glasses and plastics used to protect electronic viewing screens as defined above.

OTHER EMBODIMENTS

Other embodiments are within the following claims. For example, other dispersion vehicles can be used such as an alcohol/water vehicle for the acrylic resin. The coating may be applied by other methods such as by suitable spray apparatus, in which case a vehicle system with a more volatile organic component may be used. The method may be used for other surfaces such as for windows where privacy is desired without blocking out all light, or where it is desirable to filter out heat while still allowing some light to be transmitted.

I claim:

1. A composition for treating an external reflective-transmissive surface of a viewing screen to reduce reflected glare comprising:
    a matte varnish comprising an aqueous dispersion of an acrylic resin; and
    an aqueous dispersion of polyvinyl acetate.
2. The composition of claim 1 wherein said matte varnish comprises an antimicrobial agent.
3. The composition of claim 1 wherein said matte varnish dispersion comprises an alcohol.
4. The composition of claim 1 wherein said polyvinyl acetate dispersion comprises a water-based adhesive.
5. The composition of claim 4 wherein said composition has an adhesive volume to varnish volume ratio between 8:1 and 1:8.
6. The composition of claim 1 wherein said polyvinyl acetate dispersion comprises an alcohol.
7. The composition of claim 1 wherein the composition comprises a surfactant.
8. The composition of claim 1 wherein the composition comprises a thickening agent.
9. The composition of claim 1 wherein the composition comprises a surfactant and a thickener.
10. A method of making the composition of claim 1 comprising
    providing a matte acrylic varnish and an aqueous dispersion of polyvinyl acetate,
    mixing said varnish and polyvinyl acetate,
    thinning said mixture with an alcohol, and
    diluting the resulting composition with water.
11. The method of claim 10 further comprising heating the diluted composition.
12. A method of treating a reflective-transmissive surface comprising providing the dispersion of claim 1, and applying the dispersion to the surface to form a coating thereon.

13. The method of claim 12 wherein said surface is the plastic or glass protection of an electronic screen.

14. The method of claim 13 wherein said electronic viewing screen is a television screen or a computer viewing screen.

15. A viewing screen having an external reflective-transmissive surface that comprises a coating of the composition of claim 1.

16. The surface of claim 15 wherein said surface is an electronic viewing screen.

17. The surface of claim 15 wherein said electronic viewing surface produces light at pixels, and said coating creates enough dispersion to fill in unlit regions with information from the pixels immediately adjacent each said region.

18. The composition of claim 1 wherein said matte varnish comprises a flattening agent.

19. The composition of claim 18 wherein said flattening agent comprises a diatomaceous agent, alumina hydrate, wax, aluminum stearate, or zinc tungate.

20. A method of treating an external reflective-transmissive surface of a viewing screen comprising, providing an aqueous polyvinyl acetate dispersion, applying the dispersion to the surface, and allowing the dispersion to dry on the surface to form a coating thereon that reduces reflected glare at the surface while allowing transmission of light through the screen to permit viewing of objects behind the screen.

21. A viewing screen comprising a reflective-transmissive external surface, said surface comprising a polyvinyl acetate coating that reduces reflected glare while allowing transmission of light through the screen to permit viewing of objects behind the screen.

* * * * *

UNITED STATES PATENT AND TRADEMARK OFFICE
CERTIFICATE OF CORRECTION

PATENT NO. : 4,582,761

DATED : April 15, 1986

INVENTOR(S) : Peter D. Liu

It is certified that error appears in the above-identified patent and that said Letters Patent are hereby corrected as shown below:

Column 1, line 30 "room light" should be --room lights--

Column 1, line 57 "697,277" should be --3,697,277--

Signed and Sealed this

Fifth Day of August 1986

[SEAL]

Attest:

DONALD J. QUIGG

*Attesting Officer*        *Commissioner of Patents and Trademarks*